Dec. 30, 1969  J. T. OSBORNE  3,486,797
SAFETY DEVICE FOR WHEELS
Filed April 10, 1968  2 Sheets-Sheet 1

INVENTOR/S
JOHN T. OSBORNE

BY *Melville, Strasser, Foster and Hoffman*
ATTORNEYS

Dec. 30, 1969    J. T. OSBORNE    3,486,797
SAFETY DEVICE FOR WHEELS
Filed April 10, 1968    2 Sheets-Sheet 2
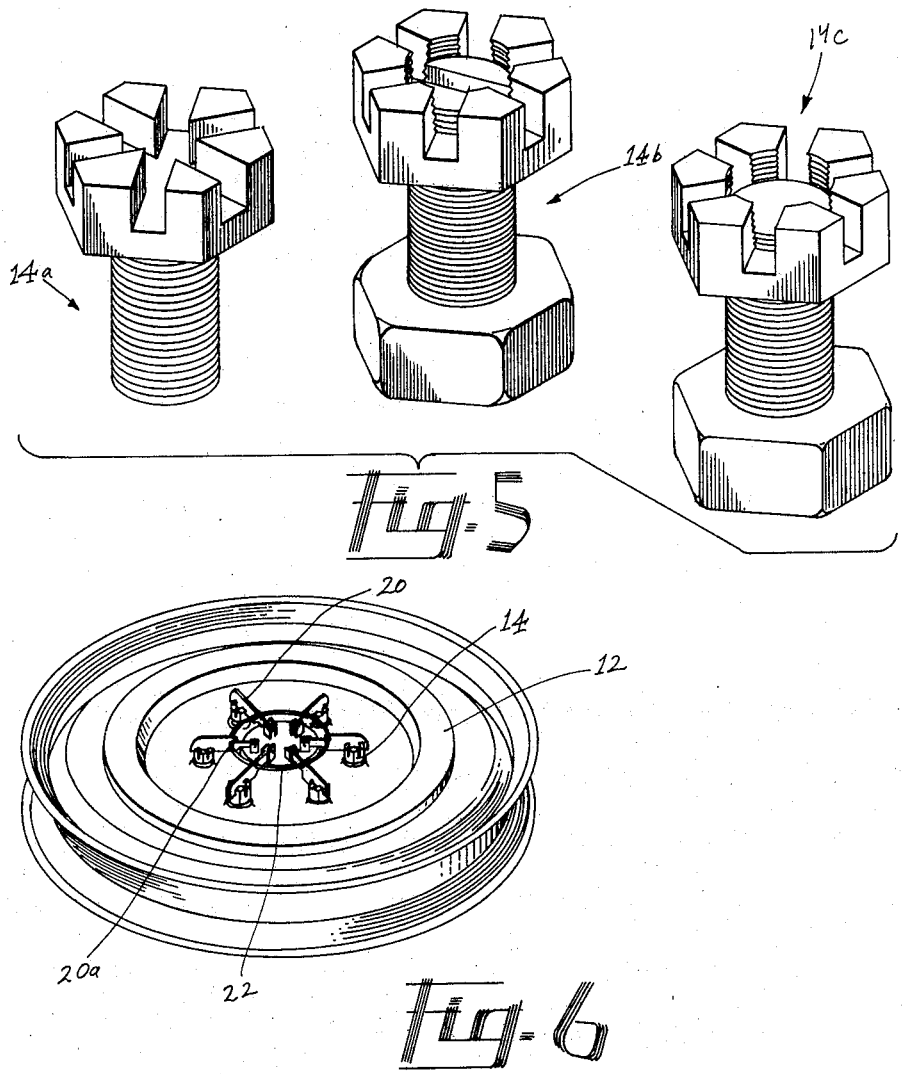
INVENTOR/S
JOHN T. OSBORNE
BY *Melville, Strasser, Foster and Hoffman*
ATTORNEYS United States Patent Office 3,486,797
Patented Dec. 30, 1969

3,486,797
SAFETY DEVICE FOR WHEELS
John T. Osborne, 1431 Amsterdam Road,
Covington, Ky. 41011
Filed Apr. 10, 1968, Ser. No. 720,284
Int. Cl. B60b 3/16
U.S. Cl. 301—9                                10 Claims

ABSTRACT OF THE DISCLOSURE

A safety device for restraining retrograde rotation of the securing lugs or bolts of a wheel comprising a plurality of locking keys carried by the wheel and positioned adjacent the wheel securing lugs or bolts, the wheel securing lugs or bolts having axially extending slots in the axially outer ends thereof and the locking keys being receivable in the slots when the lugs or bolts are tightened in wheel securing position.

BACKGROUND OF THE INVENTION

Field of the invention

The present invention relates to the art of wheels and more particularly to the provision of devices to preclude accidental disengagement of securing lugs or bolts on such wheels.

Description of the prior art

The prior art has been concerned with the problem of accidental disengagement of securing lugs or bolts on wheels for a number of years. However, all prior art devices seem to have proven unsatisfactory because they are either too complicated and too expensive to manufacture, or they leave much to be desired in their operation. Additionally, the prior art devices are not such that a positive visual observation of the wheel is all that is required in order to ascertain whether the securing lugs or bolts are tightened in wheel securing position.

SUMMARY OF THE INVENTION

The present invention provides an improvement in a wheel mounted on a hub which is provided with wheel lugs passing through a plurality of spaced apertures in the wheel. The improvement comprises a safety device for restraining retrograde rotation of the wheel lugs and includes a plurality of locking keys carried by the wheel and positioned adjacent the spaced apertures. The wheel lugs are provided with axially extending slots or notches in the axially outer ends thereof and the locking keys are receivable in the slots or notches when the wheel lugs are tightened in wheel securing position.

In preferred embodiments of this invention the wheel lugs may comprise slotted bolt heads, slotted nuts or castled nuts. Additionally, the end of each shank of the bolts which receive the slotted nuts may also be notched or slotted, whereby when a slotted nut is tightened in wheel securing position opposite slots thereon are in alignment with a slot on the end of the shank of a bolt and these slots are in alignment with a locking key.

In an other preferred embodiment of this invention the locking keys are provided with a recessed portion thereon and retaining means is associated with the recessed portions so as to bias the locking keys in the notches. The retaining means may comprise a tensioned spring loop an expandable ring or band which fits within the recessed portions or may include a cap, whereby when the cap is positioned on the wheel the locking keys are within the slots or notches and a positive visual observation of the wheel is all that is required in order to ascertain whether the wheel lugs are in wheel securing position.

The locking keys may, of course, be mounted either between the center of the wheel and the spaced apertures or between the spaced apertures and the rim of the wheel.

The present invention provides a safety device for restraining retrograde rotation of the securing lugs or bolts of a wheel which is comparatively simple and inexpensive to manufacture. Additionally, the safety device of this invention enables a positive visual observation of the wheel in order to ascertain whether the wheel lugs thereof are tightened in wheel securing position.

BRIEF DESCRIPTION OF THE DRAWING

FIGURE 5 is a perspective view showing exemplary wheel lugs which may be used with the safety device of this invention.

FIGURE 6 is a perspective view showing the safety device of this invention utilizing locking keys mounted on the wheel between the center of the wheel and the spaced apertures and showing a tensioned spring loop, an expandable ring or band which maintains the locking keys in the locked position.

DESCRIPTION OF THE PREFERRED EMBODIMENTS

The present invention comprises a safety device for wheels of all types. However, for purposes of this disclosure the safety device will be described in terms of vehicular wheels. By vehicles is meant self propelled vehicles and vehicles propelled by other vehicles, such as trailers and the like.

Figure 1:
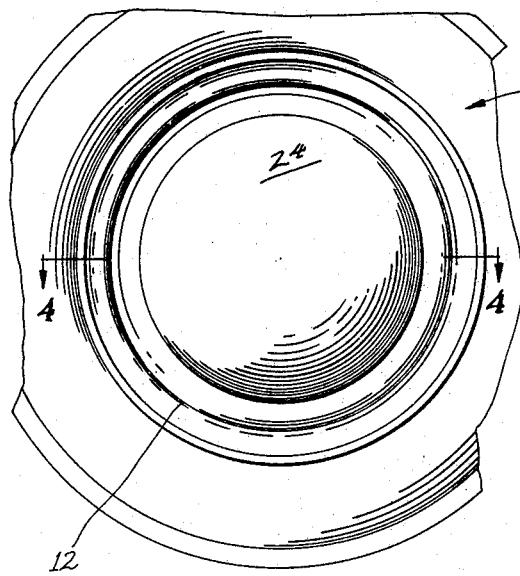
FIGURE 1 is a perspective view of a vehicular wheel illustrating the use of this invention.
Figure 2:
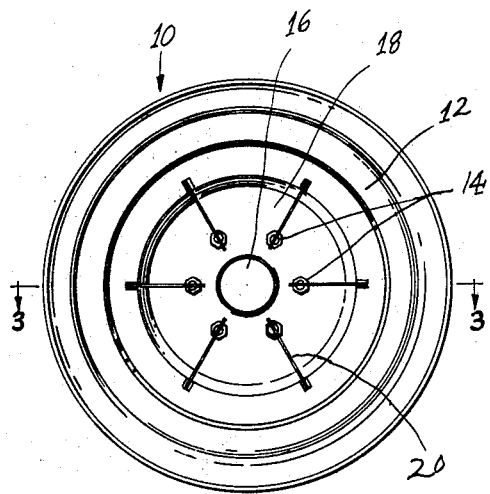
FIGURE 2 is a partial elevational view of the vehicular wheel of FIGURE 1 with the cap removed.
Figure 3:
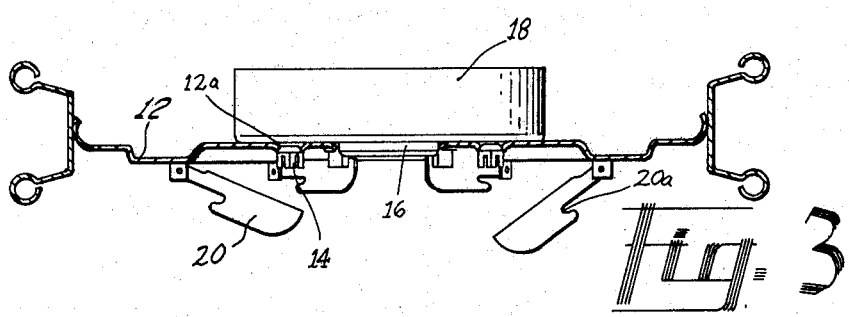
FIGURE 3 is a cross sectional view taken on the line 3—3 of FIGURE 2 when several locking keys are in the open position.
Figure 4:
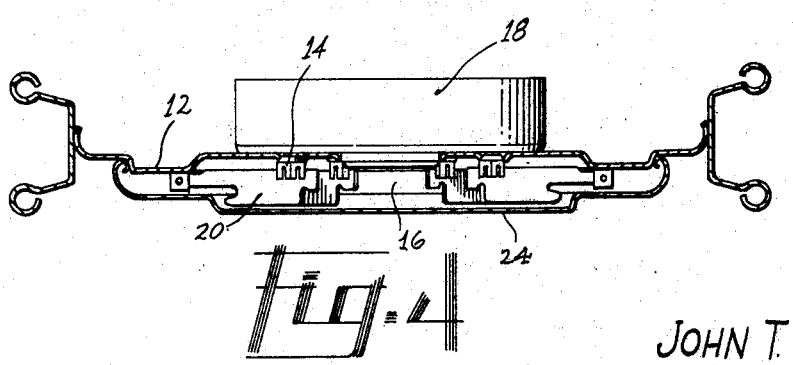
FIGURE 4 is a cross sectional view taken on the line 4—4 of FIGURE 1 when the locking keys are in the locked position and the hub cap is in place.

FIGURE 1 discloses a perspective view of a vehicular wheel utilizing the safety device of this invention. As can be seen from FIGURE 2, a typical vehicular wheel 10 is provided with a wheel 12 and wheel lugs 14 which pass through a plurality of spaced apertures 12a therein to secure the wheel 10 to a hub 16 which may have a brake drum or disc 18.

The wheel lugs 14 may comprise a threaded bolt 14a, which is simply threaded into apertures in the brake drum or disc 18, or bolts, the heads of which are brazed on to the brake drum or disc 18 and the shanks of which receive lug nuts, such as at 14b and 14c of FIGURE 5.

In a preferred embodiment, the safety device of the present invention comprises a plurality of pivotal locking keys 20 carried by the wheel 12 and positioned adjacent the spaced apertures 12a. The wheel lugs 14 are provided with axially extending notches or slots in the axially outer ends thereof and the locking keys 20 are receivable in the notches or slots when the wheel lugs 14 are tightened in wheel securing position. As can be seen from FIGURE 5, the notches or slots may be provided around the end of the heads of the bolts 14a and the lug nuts at 14b and 14c so that when they are tightened in proper wheel securing position a notch or slot will be in alignment with the adjacent locking key 20. Additionally, if lug nuts are utilized as the wheel lugs, the end of the shank of each bolt may also be notched or slotted, as at 14b. Thus when the lug nut is tightened in wheel securing position a notch or slot in the end of the shank of the bolt is in alignment with opposite notches or slots in the lug nut as well as with the locking key 20.

It will be understood that the only requirement is that the locking keys 20 be positioned adjacent the spaced apertures 12a in the wheel 12. Accordingly, the appropriate design of the wheel will determine whether the locking keys are pivotally mounted between the spaced apertures and the rim of the wheel or between the center of the wheel and the spaced apertures.

After the wheel lugs 14 are in wheel securing position and the locking keys 20 are locked, centrifugal force during rotation of the wheel will tend to cause the locking keys 20 to move to the open position. In order to preclude such movement, a recessed portion 20a has been provided on each locking key 20. Suitable retaining means may then be associated with the locking keys 20 so as to hold them in their locking position and thus restrain retrograde rotation of the wheel lugs 14. The retaining means may comprise a tensioned spring loop, an expandable ring or band 22, as shown in FIGURE 6. The spring loops ring or band is placed within the recessed portion 20a of each locking key and suitable tightening means are utilized to draw the ends thereof together. In this way the locking keys 20 are held in locking position. It is, of course, obvious that the recessed portion 20a may be located at any suitable point on the locking key so long as it is located at the same point on each key, or so long as the keys are positioned such that the tensioned-spring loop expandable ring or band 22 may be utilized. Preferably, however, the recessed portion 20a is located rearwardly on the locking keys 20, as is shown in the drawings.

In a preferred embodiment of the present invention the retaining means comprises a hub cap 24 which is of such configuration, i.e., the surface thereof is substantially contiguous with the locking keys, that its presence on the wheel 10 maintains the locking keys 20 in locking position. Since the hub cap 24 may not be properly secured on the wheel 10 until all of the locking keys 20 are in the proper locking position within the notches or slots of the wheel lugs 14, a positive visual observation is all that is necessary when the hub cap is in place in order to ascertain whether the wheel lugs 14 are tightened in wheel securing position and the locking keys 20 are within the notches or slots in the ends thereof so as to restrain retrograde rotation of the wheel lugs 14.

It will, of course, be obvious that both a tensioned spring loop an expandable ring or band 22 and a hub cap 24 may be used at the same time as retaining means to keep the locking keys 20 in their locking position and thus restrain retrograde rotation of the wheel lugs 14.

While certain preferred embodiments of the invention have been specifically illustrated and described, of course, it will be obvious that the locking keys 20 need not necessarily be pivotaly mounted on the wheel 12, but that they for example may also be slidably mounted thereon, the only requirement being that they be mounted on the wheel so as to be receivable in the notches or slots in the wheel lugs 14 when the latter are tightened in wheel securing position.

The embodiments of the invention in which an exclusive property or privilege is claimed are defined as follows:

1. In a wheel mounted on a hub by wheel lugs which pass through a plurality of spaced apertures in said wheel, the improvement comprising a safety device for restraining retrograde rotation of said wheel lugs, said safety device comprising a plurality of locking keys carried by the wheel and positioned adjacent to said spaced apertures, said wheel lugs having axially extending slots in the axially outer ends thereof and said locking keys being engageable within said slots when said wheel lugs are tightened in wheel securing position.

2. The safety device according to claim 1, wherein said locking keys are pivotally mounted on said wheel.

3. The safety device according to claim 2, wherein said wheel lugs comprise bolts whose heads are slotted.

4. The safety device according to claim 2, wherein said wheel lugs comprise slotted wheel retaining nuts which are threaded onto bolt shanks.

5. The safety device according to claim 4, wherein the end of each shank of said bolts which receive said nuts is slotted, and wherein when said nuts are tightened in wheel securing position opposite slots on each nut are in alignment with a slot on their respective shanks and said slots are aligned so as to receive said adjacent locking key.

6. The safety device according to claim 2, wherein each said locking key is provided with a recessed portion thereon, and wherein retaining means associated with said recessed portions maintains said locking keys within said notches.

7. The safety device according to claim 6, wherein said retaining means comprises a tensioned spring loop which biases said locking keys in locking position.

8. The safety device according to claim 6, wherein said retaining means also includes a hub cap the outer surface of which is substantially contiguous with said locking keys when they are in locking position, whereby when said hub cap is positioned on said wheel a positive visual observation of said wheel is all that is required in order to ascertain whether said wheel lugs are tightened in wheel securing position and said locking keys are within said slots.

9. The safety device according to claim 2, wherein said locking keys are mounted between the center of the wheel and the spaced apertures.

10. The safety device according to claim 2, wherein said locking keys are mounted between the spaced apertures and the rim of the wheel.

References Cited

UNITED STATES PATENTS

| | | | |
|---|---|---|---|
| 900,202 | 10/1908 | Pugh | 151—59 |
| 2,280,594 | 4/1942 | Horn. | |
| 2,591,631 | 4/1952 | Stanitski. | |
| 2,626,837 | 1/1953 | Wilson. | |
| 2,758,628 | 8/1956 | Rice. | |
| 2,798,770 | 7/1957 | Terrick. | |

FOREIGN PATENTS 527,998    6/1931    Germany.

RICHARD J. JOHNSON, Primary Examiner

U.S. Cl. X.R.

151—5, 59